3,000,749
REACTION PRODUCT OF SILICA PIGMENT
WITH ACIDIC HALIDES AND PRODUCTION
THEREOF
John H. Bachmann and Bernard J. De Witt, Akron, and
Franklin Strain, Barberton, Ohio, assignors, by mesne
assignments, to Pittsburgh Plate Glass Company
No Drawing. Filed Sept. 30, 1957, Ser. No. 686,860
8 Claims. (Cl. 106—288)

This invention relates to a novel method of preparing a siliceous pigment and to the novel pigmentary reaction products thereby produced. Prior to the present invention, it has been known that a silica pigment suitable for reinforcing rubber and for other purposes can be prepared by reaction of an acid or acidic reacting material with a metal silicate, such as an alkaline metal silicate, under properly controlled conditions. The preparation of such pigments is described in considerable detail and claimed in an application of Edward M. Allen, Serial No. 283,721, filed April 22, 1952, which has issued into U.S. Patent No. 2,805,955.

Pigments produced according to the process described in the above identified application are finely divided, essentially amorphous, porous, hydrated silica flocs which contain in excess of about 80 percent, and usually about 90 percent by weight of $SiO_2$, measured on the anhydrous basis (that is, on a basis excluding free and bound water). The pigment also contains bound water in the proportion of 1 mole per 3 to 9 moles of $SiO_2$. Up to about 10 percent by weight of free water may be present although the free water can be eliminated substantially completely by heating at a temperature of 105° C. for a period of 24 hours.

The term "free water" as used herein is intended to denote the water which can be removed from the silica pigment by heating the pigment at a temperature of 105° C. for a period of 24 hours in a laboratory oven. The term "bound water" as used herein is intended to mean the amount of water which is driven off from the silica pigment by heating the pigment at ignition temperature, for example, 1000 to 1200° C., until no further water can be removed, minus the amount of free water in the pigment. This bound water apparently is chemically bound in the pigment. For this reason, the bound water does not come off readily unless the silica is dried at temperatures above about 375 to 400° C.

The above described pigment has an average ultimate particle size below 0.1 micron, usually in the range of 0.01 to 0.05 micron. It may also contain small amounts of metallic components. It may contain some alkali, usually less than about 1.75 percent, preferably less than one percent by weight of $Na_2O$ (present as an alkaline type radical which is titratable by acid). The pigment may also contain up to about 10 percent by weight of an alkaline earth metal or zinc or aluminum (computed as the oxide thereof). These metals also appear in the pigment apparently in chemical association with the silica.

The surface area of the pigment normally ranges from about 10 to 600 square meters per gram and, in the case of rubber reinforcing pigments, the surface area normally exceeds 75 and is below 250 square meters per gram.

According to the present invention, it has been found that this silica pigment may be treated with an inorganic acid halide, particularly with a halide of an element of groups III to VI, inclusive, periods 2, 3, 5, and 6, as the elements are classified in the periodic table of elements. (See Handbook of Chemistry and Physics, 37th Edition, pages 388 to 389.) Preferably, this treatment should be conducted substantially in the absence of liquid water to avoid undue side reaction of the halide with water. Most advantageously, the free water is substantially completely removed (reduced below about 2 percent by weight prior to treatment with the metal halide).

Typical halides which are used for this purpose include silicon tetrachloride, titanium tetrachloride, zirconium tetrachloride, tin tetrachloride, aluminum chloride, boron trichloride, antimony trichloride, vanadium trichloride, vanadium pentachloride, phosphorous pentachloride phosphoryl chloride, arsenic trichloride, arsenic pentachloride, and the corresponding bromides, fluorides, and iodides of these metals, as well as the corresponding halides of germanium, niobium, and the like.

The treatment herein contemplated may be effected in various ways. According to one suitable method, the halide may be vaporized and passed through a bed of the silica pigment. Many of these halides, such as titanium tetrachloride, silicon tetrachloride, tin tetrachloride, and the like, are vaporized at a relatively low temperature (below 200° C.) Consequently, such materials may be readily vaporized and the vapors thereof led through a bed of the silica pigment. Alternatively, the contact may be conducted by dispersing the silica pigment and the metal halide in a chlorinated hydrocarbon, for example, carbon tetrachloride, chloroform, methylene chloride, ethylene chloride or the like, or other solvent, preferably one which is immiscible with water. In such a process, the solvent-silica-metal halide mixture is usually heated at 40 to 200° C., reflux temperature of the liquid phase, whereby evolved hydrogen halide, for example HCl, is driven off. The heating is continued until the bound water content of the silica has been reduced and/or until the product contains acid halide groups in combination therewith.

The various halides herein contemplated react with the bound water of the silica. The following are some typical apparent reactions:

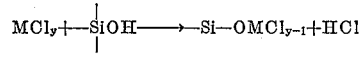

or

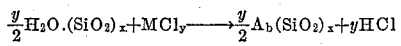

where A represents a radical comprising the metal and oxygen, such as $SiO_2$, $TiO_2$, $As_2O_3$, $Sb_2O_3$, $As_2O_5$, $P_2O_5$, $SnO_2$, and $b$ is a number representing the ratio of metal oxide to $SiO_2$.

In the case of the tetravalent halides of titanium silicon or tin, some of the reactions may be as follows:

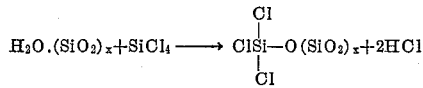

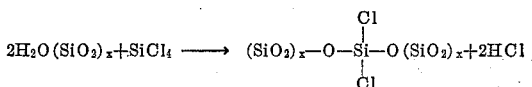

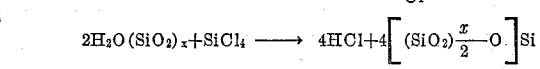

In the above equations, titanium or tin may replace silicon.

If free water is present in the pigment, the free water, of course, reacts with the metal chloride or other halide. Since the metal halide reacts more readily with the free water, it is apparent that the amount of metal halide, such as silicon tetrachloride or the like, which is used, must be in excess of that which is required to react with the free water content of the pigment. Thus, in order to achieve reaction of the metal halide with the bound water content of the pigment, the free water must be largely consumed and, where large amounts of free water are present, correspondingly large amounts of metal halide will be required. Conversely, it follows that the less free water present, the less metal halide is required.

In order to conserve the amount of metal halide required and to prevent or minimize side reaction with water, it is desirable to reduce the free water content to a comparatively low figure prior to treatment. Preferably, the free water is driven off from the pigment by heating at 100° C. or above, or by other suitable method, in order to reduce the free water content below about 2 percent by weight.

The amount of metal chloride which is used depends upon the results desired. Since bound water appears to be present in the silica as hydroxyl groups, the silica pigment is potentially capable of reacting with a maximum of two equivalents of metal chloride per mole of bound water.

Other metal halides react in the same way. In such a case, the result is to produce a silica pigment which contains acidic halide groups. As a practical matter, only about one third of the bound water reacts and the product normally contains some residual halide in the form of an acid halide radical capable of reacting with alcohols or basic agents.

Thus, the amount of metal halide which is used may range from 2 to 200 percent by weight, based upon the weight of the hydrated silica treated. Larger amounts may be used but generally are not consumed.

In order to reduce the amount of metal chloride which is required in order to consume all or the major portion of the bound water, a portion of the bound water may be driven off by calcination or heating at temperatures above about 350° C. Thus, heating at any temperature in the area of 500 to 800° C., the concentration of bound water may be reduced to the point where the molecular ratio of $SiO_2$ to bound water in the molecule is substantially in excess of 9, and may range to as high as about 85.

The temperature of the reaction normally is maintained at room temperature or above. Temperatures as high as several hundred degrees centigrade can be used.

The materials which are produced by this process are solid pigmentary powders of lower bound water content than the pigment from which prepared, but otherwise having the same general physical and chemical properties. In addition to the $SiO_2$ radical, they contain the metal radical (silica being included as a metal of the acid halide used in the treatment). In general, they also contain, as stated above, an acid halide radical. As a consequence, the pigments normally are acidic in character and highly reactive.

These pigments may be incorporated directly in rubber, preferably while avoiding contact of the pigment with the moisture normally present in atmospheric air. When so incorporated, they have more affinity for the rubber than the untreated materials. Moreover, little or no water is evolved during vulcanization.

The following are typical recipes:

RECIPE "A"

| | Parts by weight |
|---|---|
| Natural rubber | 100 |
| Zinc oxide | 5 |
| Sulfur | 3 |
| Phenyl-beta-naphthylamine | 1 |
| Benzothiazyl disulfide | 0.8 |
| Diorthotolyl guanidine | 1.8 |
| Silica (treated as described herein) | 58.5 |

RECIPE "B"

| | Parts by weight |
|---|---|
| GR-S | 100 |
| Zinc oxide | 5 |
| Sulfur | 3 |
| Phenyl-beta-naphthylamine | 1 |
| Benzothiazyl disulfide | 1.20 |
| Tetramethyl thiuram disulfide | 0.15 |
| Paracoumarone-indene resin | 15.00 |
| Triethanol amine | 4.9 |
| Silica pigment (treated as described herein) | 58.5 |

The above are typical rubber recipes. The amount of the treated silica pigment thus obtained may range from about 5 to 100 parts by weight per 100 parts of rubber.

Various rubbers which may be used are the conventional rubbers, including natural rubber, the butadiene-styrene copolymers such as those produced from 75 percent by weight of butadiene and 25 percent by weight of styrene, and the corresponding cold rubbers, the butadiene-acrylonitrile copolymers, the butadiene-isobutylene copolymers commonly known as "butyl rubber," the chlorobutadiene rubbers, and like synthetic rubber-like polymers of conjugated dienes, such as butadiene and isoprene, and copolymers of such conjugated dienes with compounds containing a single ethylenic (C=C) polymerizable group, such as styrene, acrylonitrile, acrylamide, methyl acrylate, methyl methacrylate, vinyl acetate or isocyanate rubbers and like elastomers.

These materials also may be used as reinforcing fillers for silicon resins, "Teflon" rubber and various plastics such as polyvinyl chloride, polyethylene, and the like. They also may be used as thickening agents for thickening hydrocarbon oils to produce greases.

They are also useful for production of derivatives.

Because of the appreciable content of the acid halogen in these finely divided materials, these finely divided pigments are highly reactive with alkaline agents. Thus, they may be reacted with ammonia prior to incorporation with rubber.

It is also possible to react the resulting siliceous material containing the acidic halogen radical with an amine to produce an amide. This may be done simply by adding the amine to the pigment substantially in the absence of water and heating the mixture. If desired, a hydrogen chloride acceptor, such as pyridine, may be added.

The result is to produce a siliceous pigment having hydrophobic properties. Such hydrophobic properties frequently are advantageous when the silica is used in greases or in rubber compositions.

Frequently it is desirable to remove the acid halide radicals at least partially from the treated silica pigment. This may be accomplished by heating the treated silica in a stream of air at a temperature above 100° C., usually not over 900° C.

The following examples are illustrative:

*Example I*

A quantity of finely divided silica containing about 1 mole of bound water per 6 moles of $SiO_2$ and having an average ultimate particle size in the range of 0.022 micron, and containing about 85 percent $SiO_2$ by weight and having a surface area of about 160 square meters per gram, was dried for 24 hours at 80° C. and then 5 grams of this silica was refluxed for 12 hours with 60 milliliters of silicon tetrachloride. The apparatus in which the refluxing was conducted was protected against atmospheric moisture. Thereafter, the excess of the silicon tetrachloride was distilled off in vaccuo. The resulting product contained a large amount of acidic chloride.

This product is a finely divided pigment having the general particle size of the silica subjected to treatment and is quite acidic due to the presence of the free acidic chloride groups. It reacts readily with ammonia, producing a pigment which is substantially neutral. It also reacts with amines, such as dimethyl amine, diallyl amine, or the like. For example, when 80 milliliters of diallyl amine are added to the dry product and the mixture is heated at 50 to 80° C. for 4 hours, a hydrophobic pigment is obtained after washing the product with absolute methanol and extracting it with absolute ether.

*Example II*

The process of Example I is repeated using silica containing about 0.75 percent by weight of bound water and prepared by calcining silica pigment at about 700° C. substantially as described in a copending application of Alphonse Pechukas, Serial No. 290,536, filed May 28, 1952, which has issued into U.S. Patent No. 2,805,956. After reflux, the silicon tetrachloride is distilled off and the product heated in a stream of air at 200° C. for 3 hours. A product having properties similar to those described in Example I was thus obtained.

*Example III*

One hundred grams of the silica referred to in Example I is dried at 105° C. until free water is substantially absent. This dried material is then slurried in 3 liters of ethylene dichloride containing 30 grams of silicon tetrachloride. The slurry is heated under reflux for 15 hours, the hydrogen chloride evolved being distilled off and the silica heated in dry air at 200° C. for 3 hours. The resulting finely divided product contains less than one percent by weight of bound water and a small amount of chlorine. This material is an effective reinforcing rubber pigment. The acidic character of the pigment may be overcome and an essentially neutral pigment obtained by contact of the pigment, after drying, with ammonia gas.

In the practice of any of the above examples, tin tetrachloride or tetrafluoride, titanium tetrachloride or tetrafluoride, or tetraiodide or other metal halide mentioned above may be substituted partially or completely for the silicon tetrachloride.

*Example IV*

A quantity of finely divided silica dried as in Example I and containing about 1 mole of bound water per 6 moles of $SiO_2$ and having an average ultimate particle size in the range of 0.022 micron, and containing about 85 percent $SiO_2$ by weight and having a surface area of about 160 square meters per gram, is dried for 24 hours at 105° C. and then 5 grams of this silica is refluxed for 12 hours with 100 milliliters of titanium tetrachloride as in Example I. Thereafter, the excess of the titanium tetrachloride is distilled off in vacuo. The resulting product contains a large amount of acidic chloride and titanium.

This product is a finely divided pigment having the general particle size of the silica subjected to treatment and is quite acidic due to the presence of the free acidic chloride groups. It reacts readily with ammonia, producing a pigment which is substantially neutral and which otherwise is similar to the product of Example I.

*Example V*

One hundred grams of the silica referred to in Example II is dried at 100° C. until free water is substantially absent. This dried material is then slurried in 3 liters of ethylene dichloride containing 10 grams of titanium tetrachloride. The slurry is heated under reflux for 15 hours, the hydrogen chloride evolved being distilled off and the residue heated in a stream of dry air at 450° C. for 2 hours. The resulting finely divided product contains less than one percent by weight of bound water and a small amount of chlorine. This material is an effective reinforcing rubber pigment. The acidic character of the pigment may be overcome and an essentially neutral pigment obtained by contact of the pigment, after drying, with ammonia gas.

It is also possible to react other inorganic acid halides which react with hydroxyl groups liberating hydrogen halide. Thus, the hydrated silica may be reacted with thionyl chloride, boron trichloride, boron trifluoride, phosphorous pentachloride, sulfuryl chloride or the like, to produce a product of lower bound water content.

The following is a typical example.

*Example VI*

One hundred grams of the silica referred to in Example II is dried at 100° C. until free water is substantially absent. This dried material is then slurried in 3 liters of ethylene dichloride containing 15 grams of thionyl chloride. The slurry is heated under reflux for 15 hours, the hydrogen chloride evolved being distilled off. Thereafter, the solvent is distilled off and the silica heated at 200° C. for 3 hours. The resulting finely divided product contains less than one percent by weight of bound water and a small amount of chlorine. This material is an effective reinforcing rubber pigment. The acidic character of the pigment may be overcome and an essentially neutral pigment obtained by contact of the pigment, after drying, with ammonia gas.

Although the present invention has been described with reference to the specific details of certain embodiments, it is not intended that such details shall be regarded as limitations upon the scope of the invention except insofar as included in the accompanying claims.

What is claimed:

1. A method which comprises contacting a silica pigment which has an average ultimate particle size below 0.1 micron, contains in excess of 80 percent by weight of $SiO_2$, measured on the anhydrous basis, and one mole of bound water per 3 to 85 moles of $SiO_2$, the free water content of the pigment being less than about 2 percent by weight, with a halide of an element of the group consisting of silicon, titanium, tin, aluminum, boron, antimony, phsphorous, arsenic, germanium, niobium, and sulfur, said contact being conducted substantially in the absence of liquid water and being continued until the bound water content in the pigment is reduced, hydrogen halide is evolved, and a solid siliceous reaction product containing acid halide is obtained, and recovering the solid siliceous reaction product thus obtained.

2. The process of claim 1 wherein the halide is heated while in contact with the silica pigment at a temperature of 40 to 200° C.

3. The process of claim 1 wherein the halide is titanium tetrachloride.

4. The process of claim 1 wherein the halide is silicon tetrachloride.

5. The process of claim 1 wherein the halide is tin tetrachloride.

6. The process according to claim 1 wherein the halide is an inorganic acid chloride.

7. The reaction product produced according to claim 1.

8. The reaction product produced according to claim 6.

References Cited in the file of this patent

UNITED STATES PATENTS

| | | |
|---|---|---|
| 2,207,597 | Pechukas | July 9, 1940 |
| 2,739,073 | Bertorelli | Mar. 20, 1956 |
| 2,742,378 | Te Grotenhuis | Apr. 17, 1956 |
| 2,861,872 | Heller et al. | Nov. 25, 1958 |
| 2,865,782 | Strassburg | Dec. 23, 1958 |

OTHER REFERENCES

Hackh's Chemical Dictionary, Third Edition, 1950, page 632.

Handbook of Chemistry and Physics, 37th Edition—pages 386 and 389.